United States Patent
Croy

(10) Patent No.: US 6,859,910 B2
(45) Date of Patent: Feb. 22, 2005

(54) METHODS AND SYSTEMS FOR TRANSACTIONAL TUNNELING

(75) Inventor: John Charles Croy, Middletown, RI (US)

(73) Assignee: Bluestreak.com (*) Notice: Subject to any disclaimer, the term of this patent is extended or adjusted under 35 U.S.C. 154(b) by 802 days.

(21) Appl. No.: 09/832,323

(22) Filed: Apr. 10, 2001

(65) Prior Publication Data
US 2001/0037361 A1 Nov. 1, 2001

Related U.S. Application Data

(60) Provisional application No. 60/195,933, filed on Apr. 10, 2000.

(51) Int. Cl.[7] .................... G06F 15/00; G06F 17/00; G06F 17/21; G06F 17/24
(52) U.S. Cl. .............. 715/513; 709/219; 709/227; 709/203; 705/26; 705/39; 705/75; 707/7; 707/10; 707/102; 345/748; 345/760; 345/762
(58) Field of Search ............... 709/203, 217, 709/219, 227; 705/26, 39, 64, 75; 902/40; 707/2, 7, 10, 102; 345/748, 762, 760; 715/513

(56) References Cited

U.S. PATENT DOCUMENTS

| 5,793,966 A | * | 8/1998 | Amstein et al. ............ 709/203 |
| 6,205,482 B1 | * | 3/2001 | Navarre et al. ............ 709/227 |
| 2002/0055909 A1 | * | 5/2002 | Fung et al. |
| 2002/0069244 A1 | * | 6/2002 | Blair et al. |
| 2002/0078093 A1 | * | 6/2002 | Samaniego et al. |
| 2002/0095387 A1 | * | 7/2002 | Sosa et al. |
| 2002/0152126 A1 | * | 10/2002 | Lieu et al. |
| 2003/0208684 A1 | * | 11/2003 | Camacho et al. |

* cited by examiner

Primary Examiner—Anthony Knight
Assistant Examiner—Crystal J Barnes
(74) Attorney, Agent, or Firm—Joseph H. Born; Foley Hoag LLP

(57) ABSTRACT

Methods and systems for executing an electronic transaction are provided, including parsing pages of a web server that execute a transaction to separate static from transactional content, identifying and storing rules for executing a transaction on the site, and presenting displays that enable a user to complete the transaction without interacting directly with the site, such as by interacting with a banner ad, electronic mail, cellular phone, or other simple interface.

2 Claims, 9 Drawing Sheets

METHODS AND SYSTEMS FOR TRANSACTIONAL TUNNELING

CROSS REFERENCE TO RELATED U.S. APPLICATIONS

This application claims priority to U.S. Provisional Patent Application Ser. No. 60/195,933 filed Apr. 10, 2000, the entire disclosure of which is herein incorporated by reference.

BACKGROUND OF THE INVENTION

1. Field of the Invention

This disclosure relates to the field of electronic commerce, and more particularly to the field of tunneling technology.

2. Description of the Related Art

The advent of the computer and the computer network, particularly the Internet, has revolutionized the ways people communicate and the ways people store, retrieve and manipulate data. An important function of the Internet is electronic commerce through which people shop for and procure various goods, services and information. In a typical electronic commerce transaction a user browses an Internet site that displays content related to goods, services, or information that the user may wish to procure. In addition, a typical electronic commerce transaction requires the user to enter various data into forms or fields on the Internet site, such as the user's name, address, zip code, telephone number, credit card number, quantity of item selected, and the like. Thus, a typical Internet electronic commerce transaction is enabled by a combination of display content (which might include static content, audio, video, sounds, or other displays) and transactional content (which may include any exchange of data that supports the underlying procurement of, or ordering of, goods, services, or information through the site or other similar content).

A well-known problem with the Internet is that of limited transmission speeds. A combination of limited bandwidth, due to the presence of twisted pair copper wires and other low-bandwidth physical transmission media, and transmission delays, such as queuing and routing delays, means that Internet pages can be slow to load, so that Internet navigation is slow, as are some electronic commerce transactions. Delays are particularly acute for so-called "rich media" content, including dynamic content such as animation, video, and audio. Thus, rich media content used in electronic commerce, such as advertisements, can impair the performance of Internet sites that display such content.

Some solutions have been implemented to reduce the problems of Internet performance. One such solution is web caching. Web caching solutions of a variety of types have been created by Akamai, Sandpiper, Cidera, AT&T, Inktomi, Alteon and f5, among others. Web caching locates Internet content closer to the user who is interacting with an Internet site. Closeness may be measured in terms of performance, rather than geographic proximity. For example, frequently accessed content may be located on a server that is located fewer network nodes away from end users who are likely to access it or can be located on higher speed machines or transmission services. Web caching results in faster delivery of information over the Internet.

A number of problems exist with web caching. One problem is the nature of content that is cached, namely, static content such as GIF files, static HTML pages, audio files and video files. Although this content represents a significant portion of a given web page, a large amount of content is not cached, such as dynamic content and transactional content. This is because dynamic content is often based on the cookie settings of particular users and because data for transactional content must travel all the way back and forth between origin servers. Since the content can be specific to a user, it can be difficult to cache the content close to a user. That is, the content for one user may need to be in a different place from the content of a second user. When the shear number of users of the Internet is taken into account, the problem becomes quite clear that there is no single location where dynamic content can be cached.

A need exists for a solution that improves Internet performance for situations involving static, dynamic and transactional content.

SUMMARY

The methods, systems, and means disclosed herein provide for caching of dynamic and transactional content for an Internet site either alone or in conjunction with the caching of static content. In addition, the methods and systems disclosed herein allow convenient separation of a selected Internet site into static portions that are easily cached and dynamic portions that are cacheable with an appropriately configured engine located at a web cache.

Included herein is a method of executing an electronic transaction, with various steps, including establishing a persistent connection to a server, wherein the server has a capability of executing an electronic transaction, obtaining a set of pages from the server, wherein interaction with the set of pages is sufficient to execute the electronic transaction, parsing the set of pages to separate transactional content from other content, identifying elements of the transactional content that are required to complete the electronic transaction, storing one or more rules, wherein compliance with the one or more rules satisfies the elements required to complete the electronic transaction, presenting a display to a user, wherein the display is different from the set of pages and wherein the display encourages execution of the electronic transaction, and upon interaction of the user with the display, executing the rules to send a signal to the server to complete the electronic transaction. In some situations, the static content may be cached close (performance-wise) to the user to enhance performance.

As used herein, the following terms encompass the following meanings. However, these definitions in no way limit the meaning of the term as would be understood by one of skill in the art.

'User' generally denotes an entity, such as a human being, using a device, such as one allowing access to a network. This is typically a computer having a keyboard, a pointing device, and an a/v display device, with the computer running software able to display computer-originated material typically received from one or more separate devices. Preferably the user's computer is running browser software enabling it to act as a client and communicate by the network to one or more servers. The user can, however, be any entity connected to a network through any type of client.

'Browser' generally denotes, among other things, a process or system that provides the functionality of a client, such that it interconnects by a network to one or more servers. The browser may be Microsoft's Internet Explorer, Netscape's Navigator, or any other commercial or custom designed browser or any other thing allowing access to material on a network. A browser can also include browser plug-ins.

'Client' generally denotes a computer or other thing such as, but not limited to, a PDA, pager, phone, WebTV system, thin client, or any software or hardware process that interconnects by a network with one or more servers. A client need not be continuously attached to the network.

'Server' generally denotes one or more computers or similar things that interconnect by a network with clients and that have application programs running therein, such as for the purpose of transferring computer software, data, audio, graphic and/or other material. A server can be a purely software based function. Server also includes any process or system for interconnecting via a network with clients.

'Network' generally denotes a collection of clients and servers. A network can include, but is not limited to, the Internet, the World Wide Web, any intranet system, any extranet system, a telecommunications network, a wireless network, a media broadcast network (such as, but not limited to, a broadcast television network, a broadcast radio network, or a cable television network), a satellite network, or any other private or public network.

DETAILED DESCRIPTION

Figure 1:
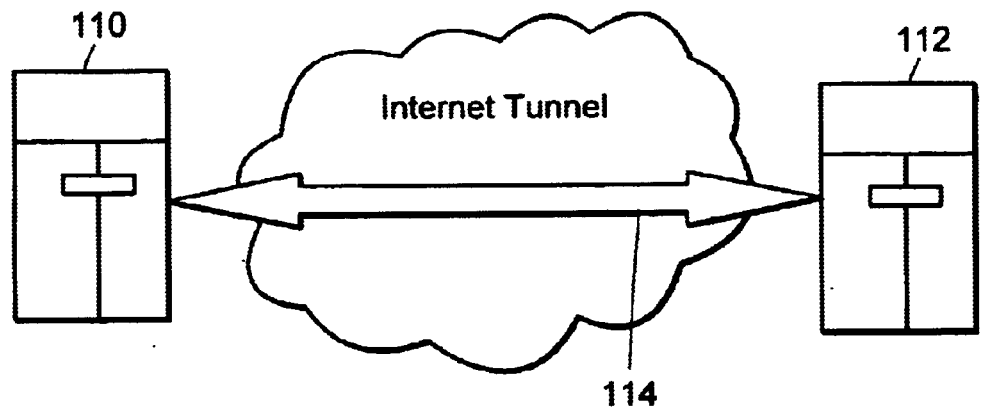
FIG. 1 describes an embodiment of conventional tunneling.

Tunneling is a method of transporting data from one server to another in a computer network. Referring to FIG. 1, conventional tunneling involves moving data from one virtual private network (VPN) or host 110 to another host 112 using a protocol, such as the Point-to-Point protocol of Microsoft Corporation. Tunneling typically uses encryption to encode data, such as RC4 encryption from RSA, which is a fast stream cipher, or Secure Socket Layer (SSL) encryption, which is a widely available public key cryptography scheme distributed by Netscape Corporation. SSL is supported in almost all browsers and web server technologies. Tunneling also implies that once a connection 114 is established between servers, it remains open over a sustained period of time.

Figure 2:
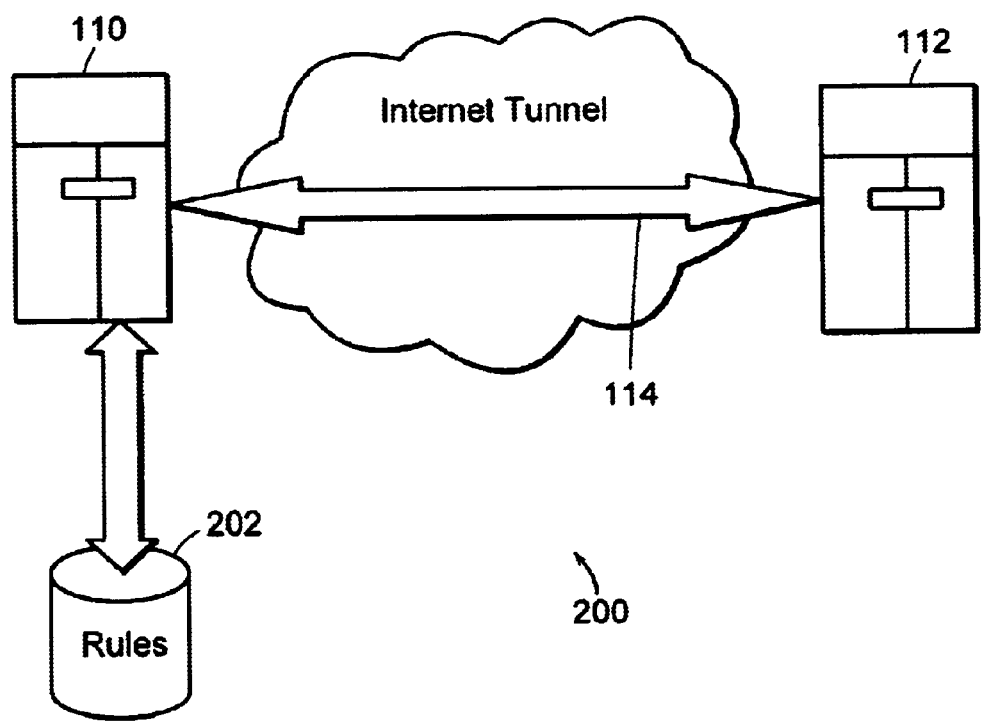
FIG. 2 describes an embodiment of transactional tunneling.

Referring to FIG. 2, transactional tunneling is a form of tunneling that moves transactional groups of data according to a pre-defined set of transactional rules. In the configuration 200 of FIG. 2, the host 110 and the host 112 are connected by the connection 114 as in FIG. 1. However, in transactional tunneling, there is at least one protocol layer on top of conventional tunneling. It relies upon the functionality of the tunneling layer below, namely, encryption and an ability to transport data. Thus, a set of rules are stored, such as in a rules database 202, which establish the transactional protocol on top of the tunneling.

Transactional tunneling enables support of HTTP data to web servers from a dedicated smart client application, where a smart client is an unmanned application, rather than a browser operated by a person. Business applications that require this type of solution can be web advertising servers, distributed global servers of transactional content, and shopping robots, among others. A smart client enhances the functionality of a web server's functionality. A smart client has a "multiplier effect" on functionality of a web server, permitting the web server to, among other things, build advertisements and serve them across the Internet, duplicate behavior of a web site, send email to customers encapsulating web site sign-ups, enable global serving of a web site from an origin server, and perform web site visualization and redundancy checking.

Transactional tunneling is desirable to communicate with HTTP web servers because they are designed to deliver content primarily to human beings. They transport content according to the HTTP protocol, and the content for human viewing is presented as executed HTML. Responses to transactional web pages are done using URL encoded data sets, including Common Gateway URL encoding schemas. Since web content is oriented to human beings, enabling a machine to communicate with a web server is not an easy task. To do so, the connection must be managed, and the syntax of the data language that the server uses must be employed. To do so requires a solution that manages the connection, the data flow, the data syntax and the encryption.

Figure 3:
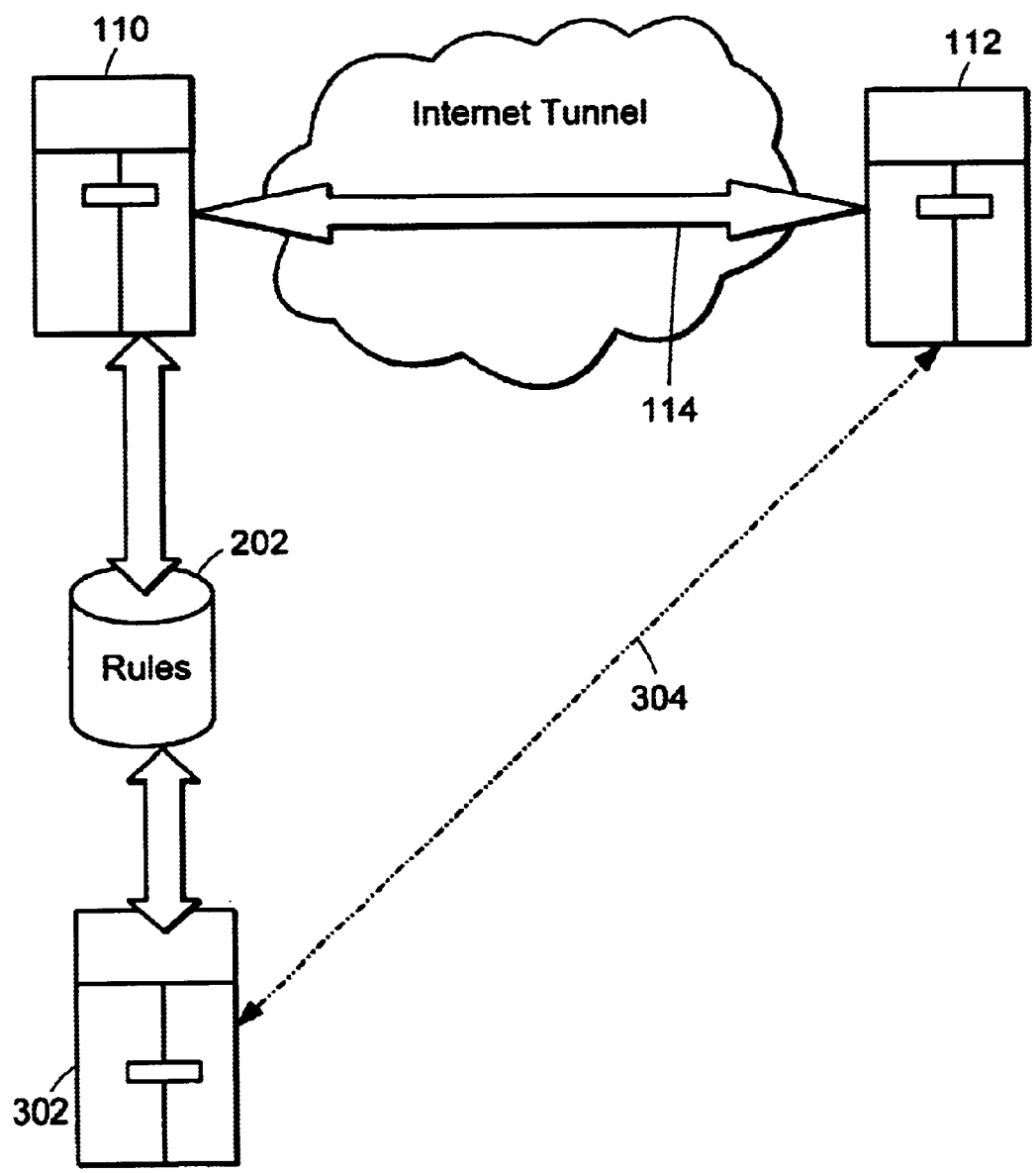
FIG. 3 describes an embodiment of a configuration with elements for tunneling to a web server.
Figure 4:
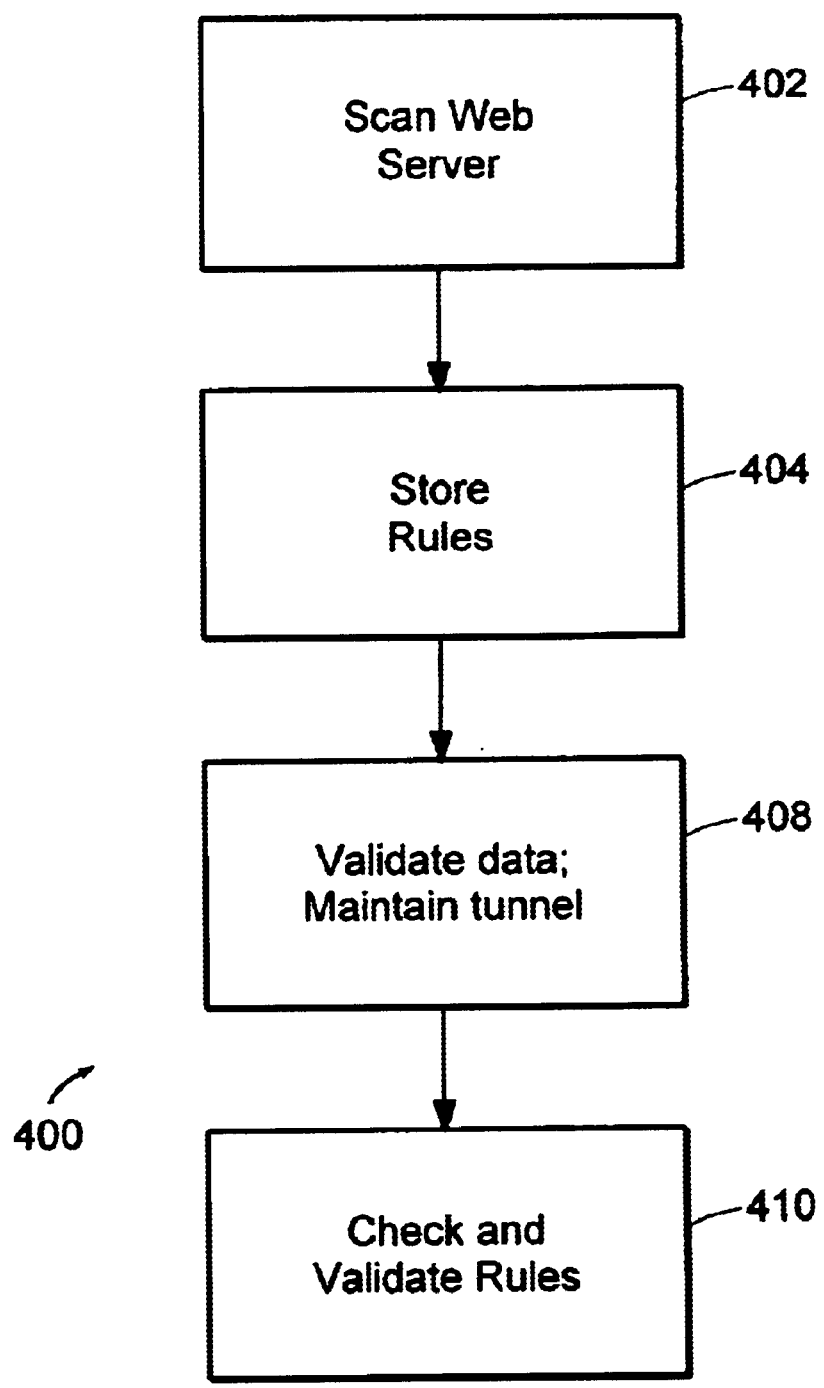
FIG. 4 shows a flowchart depicting the steps of an embodiment for generating a transactional tunnel.

Referring to FIGS. 3 and 4, it is a four step process to tunnel to a web server. The flow chart 400 of FIG. 4 depicts the steps for tunneling. First in a step 402, the web server must be scanned and its data syntax and connection rules must be defined. Next, in a step 404, rules must be stored in a database using a well-defined syntax. Next, in a step 408, using the previously identified rules, any data requiring tunneling must be validated, the connection managed, and the data encrypted. Finally, in a step 410, the rules must be periodically checked and validated against the web site in case the rules need to be refreshed. FIG. 3 depicts a configuration 300 with the elements for tunneling to a web server. A rules engine 302 makes a connection 304 to the destination web server 112. The rules engine 302 accesses the rules in the rules database 202, which can also be accessed by the first host 110.

The methods and systems disclosed herein provide for caching of dynamic and transactional content for an Internet site either alone or in conjunction with the caching of static content. In addition, the methods and systems disclosed herein allow convenient separation of a selected Internet site into static portions that are easily cached and dynamic portions that are cacheable with an appropriately configured engine located at a web cache. Although the examples presented below will discuss caching of dynamic or transactional information primarily in conjunction with advertising over the World Wide Web, it would be obvious to one of skill in the art that the technologies described below could be used in conjunction with any type of dynamic or transactional content that could be served over a network. Therefore the invention below includes, but is not limited to, caching of advertising material, caching of Internet purchasing information, caching of information specific to an individual user, and/or caching of any other type of dynamic or transactional content. This caching may be performed on any type of network including the Internet, the World Wide Web, any intranet or extranet system, or any other type of network known now or later developed.

Figure 5:
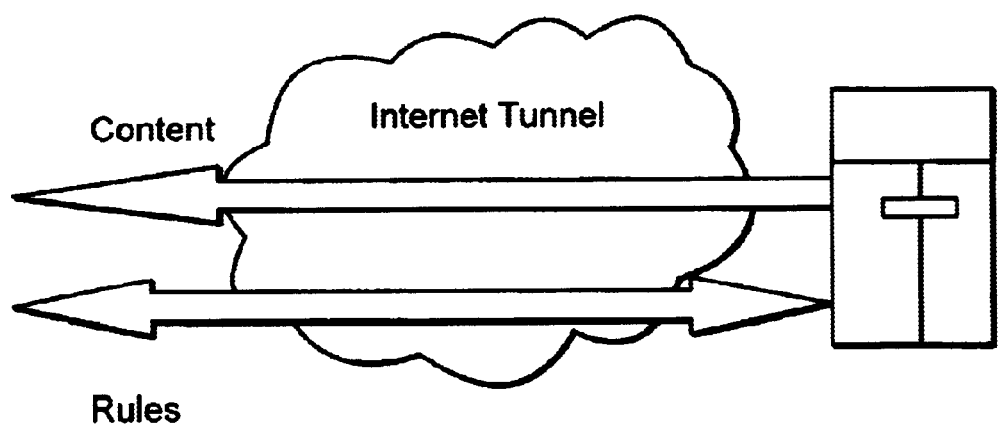
FIG. 5 depicts the separation of rules from content from HTML as received from a destination site in an embodiment.

Web server content can be thought of as having two constituent parts: first, static or flat HTML content that is viewed by a user accessing the site, and second, rules for communicating with the web server containing the site. In the methods and systems disclosed herein, the HTML content is separated from the rules for interacting with the site. Although the two elements are bound together in an HTML document, the portion that communicates with the web server can be separated from the portion that is presented to the user. This need not be a physical separation and the two portions can still be contained in the same document or file, but they can be understood as being separable conceptually. FIG. 5 depicts separation of rules from content from the HTML that is retrieved from a destination site.

The transactional tunneling methods and systems disclosed herein provide speed, reliability, and cost-effectiveness. First, a persistent connection between the client and server can be established and maintained, which can be accomplished using TCP/IP relying on TCP to manage open stream connections. SSL, which is widely adopted, can be used to encrypt data. A variety of errors can occur in tunneled transactions. Malformed transactions that supply incorrect data should be guaranteed not to happen, and transactions that break a connection should be minimized. Alarms should be established to warn operations personnel if a problem occurs. Second, the persistent connection can be selected so as to be optimized. Standard routing for networks (such as IP networks, and/or the Internet) is not always optimized. When a user is connected to a server, that connection is chosen at the time of connection and may go through any number of routes. These routes may contain a suboptimal segment of transmission media, for instance, a lower grade cable. When a tunnel is established, and because of its persistence, a tunnel can placed on a preselected optimized route and can the maintain that route indefinitely. Both of these potential benefits of transactional tunneling can create increased efficiency on networks and can allow network users trying to interact with remote servers do so faster.

The transactional tunneling methods disclosed herein provide a robust solution for transactional tunneling. The tunneling is a sophisticated solution that builds upon existing standards and opens opportunities for many permutations of business. The solution layers on top of HTTP and utilizes the functionality of layers beneath it, including HTTP, SSL and TCP/IP.

The methods and systems disclosed herein in one embodiment permit an operator to scan a multi-page web site and identify form fields, to store rules in a database, to re-use rules by providing an HTTP receptor to rules, to generate code or HTML forms to use the rules and to store each transaction enabled with the web server in an encrypted database.

Figure 6:
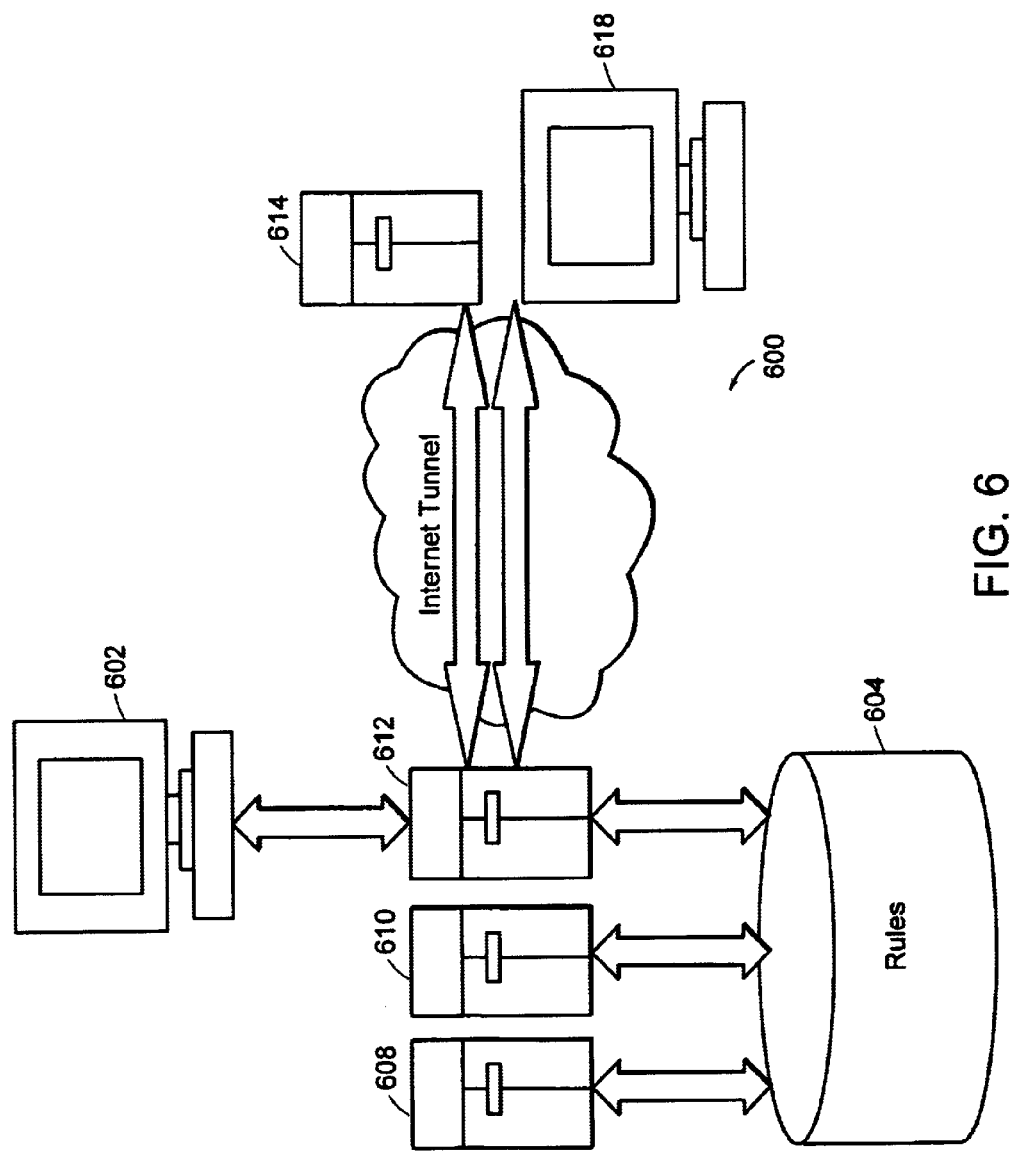
FIG. 6 depicts functional elements for an embodiment involving transactional tunneling.

Referring to FIG. 6, a configuration 600 is provided indicating functional elements for the methods and systems disclosed herein. A number of functional elements may be provided, including a graphical user interface 602 or administration tool, a rules engine 608, a tunnel engine 610, a web server engine 612, and a rules database 604. The configuration allows the operator to interact with the destination web server 614 and the client 618 using the rules.

At a high level, the graphical user interface 602 assists an operator in scanning web site pages that permit execution of a transaction, identifying transactional elements, such as form fields, and identifying rules for submitting data to the transactional element. A second high level component, a servlet side validation engine, validates data that is received when a user interacts with a display or other element that the operator creates. The validation engine and administration tool can reside both on a server of the operator and on a client machine of the operator. Both the client-side and the server-side can operate mutually according to a validation rule that is stored in the rules database 604.

The graphical user interface (GUI) 602 may consist of a served application built on client JAVA technology and running on any conventional web browser. It may be made accessible from a site that is provided by a host of the methods and systems disclosed herein. The site may include password protection. The graphical user interface 602 preferably permits the operator to enter the URL of a site that that operator wishes to scan, to identify form field rules, to test data submissions, to store rules in a database for re-use, and to establish alarm conditions and alarm routing instructions.

The rules engine 608 may consist of a server-side application that communicates with the graphical user interface 602. The rules engine 608 may be a multiple threaded application that is responsible for driving the graphical user interface 602, building the rules from a destination web site, and storing the rules in the rules database 604. The rules engine 608 can generate content, including HTML content and other coded content for providing displays, such as rich media advertising displays. The rules engine 608 also enables easy re-use of rules. The generated to content can be provided with metadata for easy access to database rules.

The tunnel engine 610 plugs into the rules engine 608 as well as the web server engine 612. The tunnel engine 610 is responsible for encrypting data, managing the HTTP connection state, and transporting data to the destination web server.

The web server engine 612 exposes the rules that are established in rules database 604. The web engine can record all transaction activity in an activity log, and controls access to the rules database 604. The web engine 612 uses the rules engine 608, the tunnel engine 612, and the rules database 604. It triggers alarms whenever it detects a mismatch of rules.

The rules database 604 may be any JDBC compliant database, such as Oracle, SQL Server, or the like. The database may store rules that can be used, once identified, to provide a way of pre-validating data before it is submitted to a destination web site, such as to prove that any data to be submitted to the site is properly formatted. For example, if a form on the web site requires name, zip code, and phone in a format, the rules can check submitted data to ensure that it is properly formatted for submission (for instance, that a zip code contains no letters, only numbers). Further, a user may click a single click on an advertisement, but the transaction may require submission of data to fields on five different pages of the destination site (for instance, if name and zip code are submitted on different pages). The rules database 604 can direct how to parse the data to be submitted to direct it to the appropriate pages on the destination site.

Figure 7:
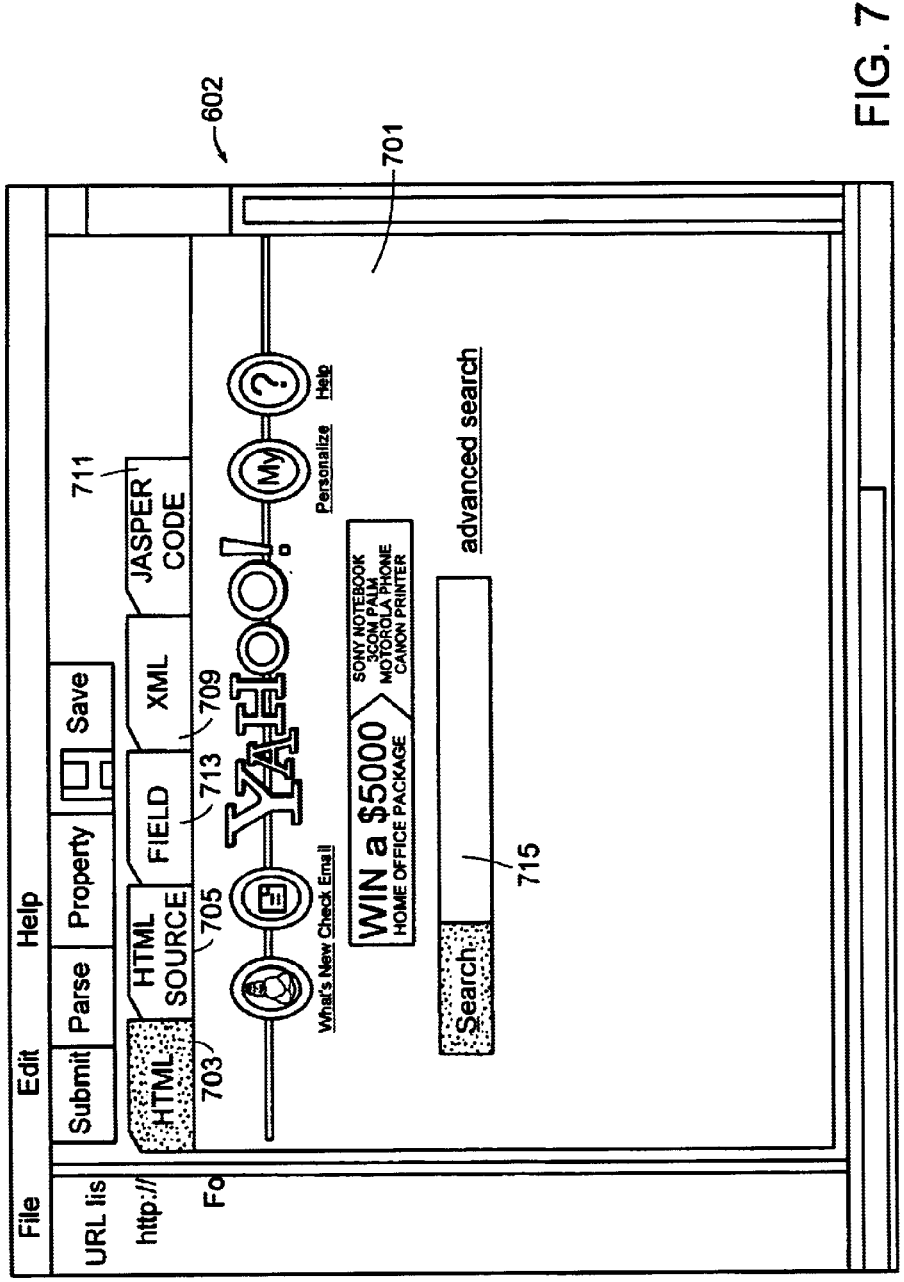
FIG. 7 shows an embodiment of a graphical user interface (GUI).
Figure 8:
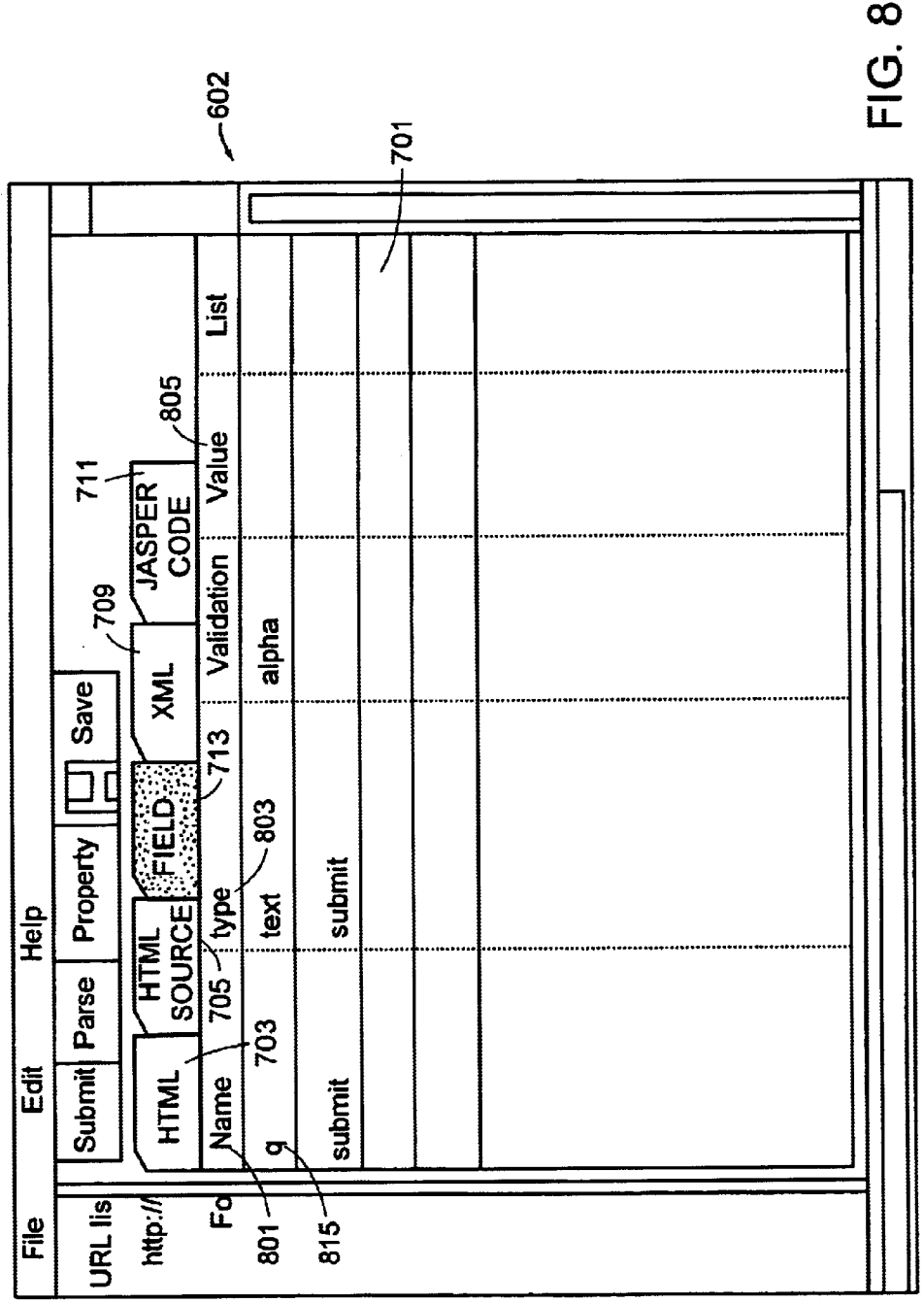
FIG. 8 shows a field view of the embodiment of a graphical user interface depicted in FIG. 7.

The graphical user interface 602 is an administrative component that the operator or host can use to assist in parsing a web site into static and transactional components, and to configure the connection to a selected web site. FIG. 7 shows an example of one graphical user interface 602 of the present invention. In that figure, the graphical user interface 602 is being used by an operator to configure transactional content that contains a search engine. In this embodiment, the operator is a provider of advertising displays, and the operator has decided to use the Yahoo! search engine in an advertising display. The operator has therefore accessed the Yahoo! search engine webpage 701 through the graphical user interface 602. On the graphical user interface 602 there can be seen five separate file tabs which correspond to different types of views the operator can have of the Yahoo! site. The currently selected tab is the HTML tab 703, which is showing the web page as it would appear to a user. Thus this tab 703 shows the executed HTML. Other tabs will show other views of this page. The HTML Source tab 705 would show the underlying HTML source code that generates this page. The XML tab 709 will show XML data relating to the use of fields and the linking of the transmission tunneling to XML language parameters. The Jasper Code tab 711 shows the page as laid out in the proprietary Jasper language, a language for generating rich media displays. It should be understood that in accordance with the methods and systems disclosed herein, an operator could create a graphical user interface 602 for creating displays or other content with any suitable language. The Field tab 713 will show the operator the fields which can be activated in the page they are currently viewing. FIG. 8 shows the same Yahoo! webpage laid out by fields. On the field layout, there are separate columns showing the name of the field 801, the type of field 803, and the value of the field 805. In this particular example, one of the entries (labeled "q") 815 is for a field corresponding to the search entry box 715 visible in FIG. 7. If a value is entered corresponding to this field, Yahoo will perform the search on that value. In this way the operator can discover the fields that will need to have values defined in order to execute their desired action. Once this field has been located, the operator, as described below, can use this field in conjunction with their other content to allow a user to search through an alternative connection.

The graphical user interface 602 or administration tool can be embodied as a JAVA application or a JAVA applet that permits the operator to access it through the Internet. The main purpose of the graphical user interface 602 is to enable creation of validation code; that is, code that validates the data that will be submitted to a destination web site where a transaction will occur. In addition, the graphical user interface 602 enables cookie control, email notification, transaction data and operator information.

To create validation code, the operator can have two choices. First, the operator can use the graphical user interface 602 and enter a URL. The system scans the URL, parses the first page of the HTML, and displays the result of the parsing. Then the operator can modify the currently scanned information from the site by selecting the HTML tab 703 and can also submit specific data that is modified by the operator to the destination web site. All of the properties, such as cookies, submitted type (GET, POST, etc.), and form tags within HTML that occurred during submission are recorded, such as in XML validation code. The XML validation code is usually in accordance with the XML 1.0 Document Type Definition (DTD) published by the World Wide Web Consortium of the International Standards Organization. Alternatively, the operator can create each field manually. The operator can design the steps with whatever fields and validation types the operator prefers. The validation of this HTML code is like text, email, or the like. The user can set up specific properties, such as URL, submit type, and cookies.

Figure 9:
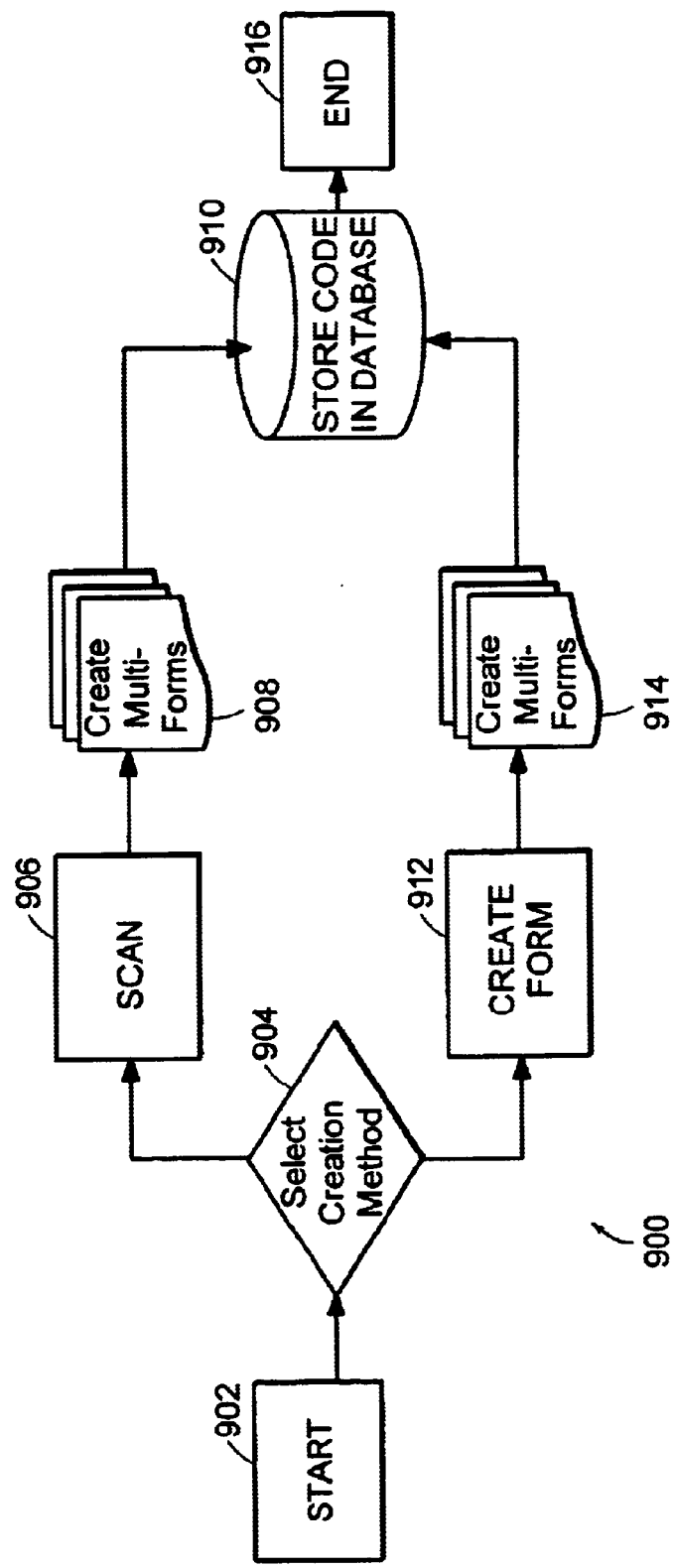
FIG. 9 shows a flowchart with the steps of an embodiment for creating validation code.

FIG. 9 depicts a flow chart 900 with steps for either automatic or manual creation of validation code. First, at a step 902, the process initiates. At a step 904 the operator indicates whether to automatically scan a URL or to manually create a form for a transaction. If the user selects automatic scanning, then the user enters the URL at a step 906 and creates forms at a step 908 as indicated above by interacting with the graphical user interface 602. The automatic scanning mode can present a tree view on the left portion of the display screen that shows the current HTML configuration, as well as a content panel that includes the five sub-panels, HTML, HTML Source, XML and JASPER Code views. The tree view presents the current HTML, so that if the operator submits the modified data to the selected URL, it should be parsed and should present a child node to show the next step. Clicking a particular tree node can display the relevant content for that node in the display panel. The content panel is separated to assist in creation of the validation rule. The HTML and HTML Source views assist the operator in creating validation code, by displaying the form fields, tags and the like that will be needed in order to submit a transaction to the destination site. The Field view shows the list of input tags in HTML, as well as the value of the tags and the appropriate validation rule (e.g., confirming that the entered data is of the type necessary to complete the tagged element). Whenever a user makes changes in the Field panel, changes are automatically made in the XML panel, which shows the code that will serve as validation code. Thus, an operator can, without knowing XML, create XML code by interacting with the other panels. The automatically created XML code has the input tag data from the HTML code, as well as other properties for submitting to the destination web site for the transaction, such as URL, and type of submitted data. The Jasper Code panel (which could represent any proprietary language for creating content that is to be associated with the transactional content found at the URL) displays proprietary code, if any, for the URL. For example, the code can be design code for designing a rich media banner advertisement or other display. Thus, the creation of a validation rule for submitting to a destination web site can happen simultaneously with creation of a rich media display or other presentation. Each element in the tree structure may be given an index or identifier, which can be associated with the related validation code. The ID may be created when the operator wishes to save particular rules or validation code. Once the validation code is complete, the operator stores the forms in the rules database 604 at a step 910.

If at the step 904 the operator opts to manually create a form, the operator creates the form by interacting with the graphical user interface 602 at a step 912. Using a similar graphical user interface 602, the operator manually enters HTML code, validation code, and other elements to create the appropriate forms for submission to the destination web site. The operator then creates additional forms as desired at a step 914, and stores the forms in a step 910, at which point the process terminates at a step 916.

Various validation data types can be used to confirm that data submitted by a user is appropriate for a given form field, including Alpha, Numeric, email, True-False, Static, ETC (unchecked), Date, Month, Weekday, and Zip Code types.

The methods and systems disclosed herein can create a paradigm and system that allows the operator to scan a site, identify the form fields, and generate XML rules that, after a site is analyzed, allow the operator to validate form transmission data that is directed to that site. The transactional tunneling methods and systems disclosed herein parse code like a browser, laying out the parsed HTML into form fields, which permits the operator or user to, for example, run words against fields and submit them back to the parsed web site. Rules are supplied to the web server engine 612, which makes the rules available to all advertisements or transactional data to be submitted to the destination web site.

The methods and systems disclosed herein make HTML reusable. They parse and store XML in engines, then put another presentation layer on top, giving more flexibility to the presentation layer.

Figure 10:
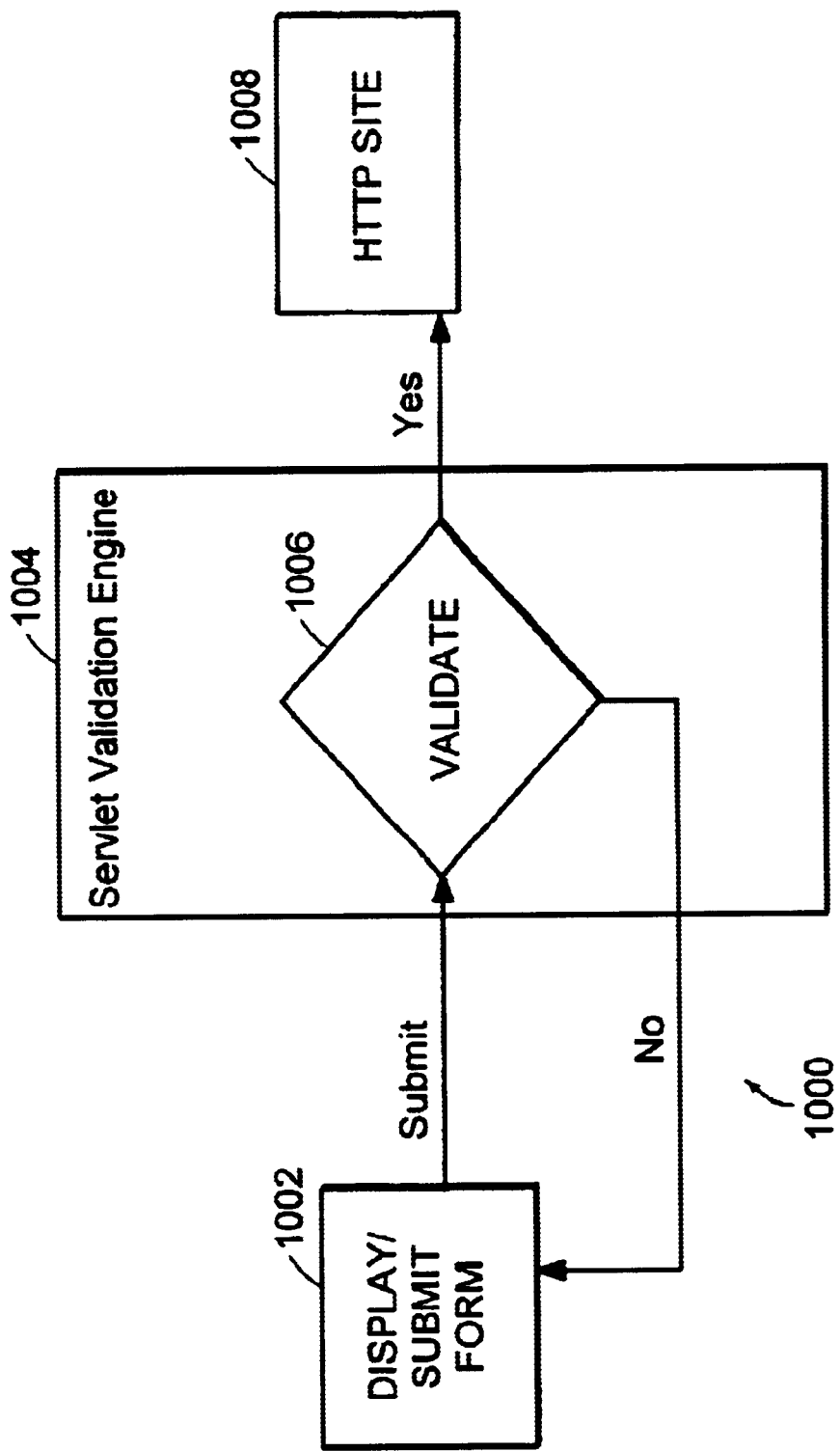
FIG. 10 shows a schematic of an embodiment of the functions of a servlet validation engine.

JAVA-based servlets can be used to track and collect data regarding what transactions were executed, permitting checking of transactions and establishment of alarms for failure situations (e.g., renamed fields, servers down, or the like). The servlet validation engine can exist as part of the server-side processor for the operator who wishes to create a presentation, such as a rich media advertising display, that will be associated with transactional content, such as content from a destination web site. When the user presses a submit button (or otherwise initiates a transaction the user wishes to engage in with the destination web site), the servlet validation engine gets data from the user's submission to validate the code from the database with the identifier and index number for that code element. The submission can automatically send the identifier and index number with the servlet engine URL, so that the servlet validation engine can check the ID or index value and return an error message if the ID or index is not recognized. The error or validation can be stored in a transaction log by the servlet validation engine. After getting validation code from the rules database 604, the servlet validation engine compares the submitted data to the stored data types. If the data are of suitable types, then the engine sends the data to the destination site that is specified in the validation code, which executes the transaction with the data. A confirmation can be sent to the user once the transaction is executed. Referring to FIG. 10, a schematic 1000 indicates the functions of the servlet validation engine 1004. At a step 1002 the user interacts with a display or submission form (e.g., a banner ad, email, offer, submit button, link, form, template, icon or any other element that indicates the user should activate the element to complete a transaction), resulting in submission of data to the servlet validation engine 1004. At a step 1006, it is determined whether the submitted data complies with the validation rules from the rules database 604. If not, processing is returned to the user with an error message. If so, then the data is submitted to the destination web site in a step 1008.

In another embodiment of the invention, the individual data is not submitted following the validation. Instead, all the data are batched and submitted in a single communication. This is of particular use for devices such as, but not limited to, wireless Internet connection devices, wireless modems, web accessible phones, devices connected through a mobile phone, satellite connected devices, other wireless devices, or other devices where the device does not maintain a continuous connection with the network. In this type of transaction, referred to as a transactional proxy, the rule generation and validation steps occur in the same manner as is described above. However, once the validation has been completed, the individual data is not submitted but is batched until a later time when the system makes a connection and all the data is submitted. This allows for the preservation of resources since there is less need to establish and reestablish connections. The system can also use a mixture of communication after validation and batching to achieve a more efficient transfer from any type of device.

The methods and systems disclosed herein can be used in a variety of commercial contexts, including any applications where it is desired to serve richer content faster, especially where transactional content is required. Other applications include shopping bots, where it is desirable to permit them to transact on the spot. The methods and systems disclosed herein can enhance a price engine by providing improved transactional capability. The methods and systems disclosed herein can also be used as an HTML to XML translator, thereby permitting convenient translation of older web content to XML.

By way of example, the methods and systems disclosed herein can be used as a proxy for advertisements that are capable of communication with a web site. Thus, it is possible to create advertisements that have forms in them, which can, through transactional tunneling, submit data to a web site on which the advertisement resides (or other web site), gather results back from the web site, and parse the signals in both directions so as to encapsulate an entire transaction, such as a buying transaction, in one advertisement.

In another example, the methods and systems disclosed herein can create an advertisement that has a search engine in it. In order to carry out such a search previously, it would have been necessary for the user to be forwarded to a search engine and to enter their desired search from there. Such a task is not desirable for advertising because it sends the user from the advertisement (which has caught their interest) to a potentially unaffiliated search engine where the user may forget the product they were interested in and search for other topics. In the invention, a search engine can be identified as the destination web site. The site can be scanned using the graphical user interface 602, which identifies all pages at the site, all form field values, all session cookies, and all validation rules (including by human trial and error for server-side rules not visible in HTML) as was discussed above for the Yahoo! web site. These items can be stored in the rules database 604 in XML. The operator can then create an advertisement that includes a form field for a search. The advertisement can then appear with an entry box similar to that on the Yahoo! site asking if the user would like to perform a search. This box can be a form field that has been connected by rules in the rules database 604 to the form field to carry out the search on a search engine. When a viewer enters a search term into the form field on the advertisement, the system can then retrieve and execute the rules and supply the information to the search engine, which in turn supplies the search results to the advertisement. This allows the search to be performed and a result to appear to the user possibly within the advertisements area or in a related area without the user leaving the advertisement. It makes the advertisement interactive. At the same time since the rule is the only item used, it allows for faster transactions because the system has been transactionally tunneled.

In another embodiment, the transaction tunneling could be used to enable purchase of an item from a web site. The operator could go to the destination site, identify pages, form field values, session cookies, and the like. Again, the server-side rules can be inferred by trial and error. The rules can be stored in XML. The form field for a purchase can be included in an advertisement. When the field is completed by interacting with the advertisement, the rules are retrieved and executed in which case the data is sent to the retail site to purchase the item. The purchase transaction can be completed by the user through another location such as an advertisement for the product.

In yet another embodiment, the transaction tunneling can be used to allow for improved performance from an interactive web site such as but not limited to a search engine, an e-commerce website, an information gathering website, or any other type of website where any type of data or information is gathered from the user of that website. The following shows an example of such improved performance. If a user was situated in Frankfurt Germany and wished to purchase a product from an online retailer whose origin server (containing the information from their website) was located in Malden, Mass. using traditional systems and methods, that user would have to have each piece of information transferred between Malden and Frankfurt. This would include all information the user entered as well as content from the site. Even with high speed lines, there can be significant delay for such a transaction to take place. If the system was to use transactional tunneling as discussed herein the user could be provided a much faster interaction with the e-tailer. The static, dynamic, and transactional content could be cached at a remote server nearer the user (for instance in Frankfurt) allowing for a faster connection between the user and the cached content. This remote server can then establish a high speed connection with the origin server in Malden, Mass., to provide the transactional data (from field values, etc.) to the origin server in Malden. This line may allow for a persistent connection between the remote server and the origin server and/or can be a specifically chosen line for high speed routing. With a transactional tunnel, the route can be pre-established and can be optimized allowing for improved communication speed for users distant geographically and/or in performance from the origin server they wish to interact with.

In other embodiments, the methods and systems disclosed herein can be used cache transactional and dynamic content. In particular, parsing web pages permits storage of all static content close to the web server or user, while only transactional content is passed around.

The methods and systems disclosed herein can also be used to run advertisements on a wireless or handheld device, and as an e-commerce proxy in the wireless arena.

In other embodiments, the advertisement could take the form of a banner advertisement, link, or email. The transaction could also be enabled by a cellular phone or wireless transaction.

While the invention has been disclosed in connection with certain preferred embodiments, other embodiments should be understood to be encompassed in the present disclosure as would be understood by those of ordinary skill in the art.

What is claimed is:

1. A method of executing an electronic transaction, comprising:

establishing a persistent connection to a server, wherein the server has a capability of executing an electronic transaction;

obtaining a set of pages from the server, wherein interaction with the set of pages is sufficient to execute the electronic transaction;

parsing the set of pages to separate transactional content from other content;

identifying elements of the transactional content that are required to complete the electronic transaction;

storing one or more rules, wherein compliance with the one or more rules satisfies the elements required to complete the electronic transaction;

presenting a display to a user, wherein the display is different from the set of pages and wherein the display encourages execution of the electronic transaction; and upon interaction of the user with the display, executing the rules to send a signal to the server to complete the electronic transaction.

2. A method of claim 1, further comprising:

caching static content from the set of pages.

* * * * *